United States Patent
Smith et al.

(10) Patent No.: US 7,482,385 B2
(45) Date of Patent: *Jan. 27, 2009

(54) WETTING AGENT FORMULATIONS FOR HYDROTROPIC MOISTURE CONTROL OF SUBSTRATES AND DISPERSED PHASES

(75) Inventors: James W. Smith, Las Vegas, NV (US); Morris D. Key, Sherman, TX (US)

(73) Assignee: Envirospecialists, Inc., Forth Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/744,228

(22) Filed: Dec. 22, 2003

(65) Prior Publication Data

US 2004/0192788 A1    Sep. 30, 2004

Related U.S. Application Data

(60) Provisional application No. 60/435,854, filed on Dec. 20, 2002.

(51) Int. Cl.
*B01F 17/38* (2006.01)
*C09K 3/22* (2006.01)

(52) U.S. Cl. .................... 516/204; 516/55; 516/123; 516/904; 516/906

(58) Field of Classification Search ............. 516/204, 516/55, 123
See application file for complete search history.

(56) References Cited

U.S. PATENT DOCUMENTS

| | | | |
|---|---|---|---|
| 3,648,434 A * | 3/1972 | Gravis et al. ................. 95/192 |
| 4,737,305 A | 4/1988 | Dohner | |
| 4,978,390 A * | 12/1990 | Snedeker ................. 106/31.09 |
| 5,223,165 A | 6/1993 | Winstanley et al. | |
| 5,331,022 A * | 7/1994 | Jochmann et al. ........... 523/136 |
| 5,746,837 A * | 5/1998 | Beck et al. ..................... 134/2 |
| 5,785,813 A * | 7/1998 | Smith et al. ................. 162/158 |
| 6,372,842 B1 | 4/2002 | Grisso et al. | |
| 6,420,474 B1 * | 7/2002 | Carey et al. ................. 524/501 |
| 6,547,925 B1 * | 4/2003 | Drew et al. ................. 162/111 |
| 6,607,566 B1 * | 8/2003 | Coleman et al. ............. 44/301 |
| 7,004,687 B2 * | 2/2006 | Smith et al. ................. 405/264 |
| 2002/0065352 A1 | 5/2002 | Johnston et al. | |
| 2003/0056648 A1 * | 3/2003 | Fornai et al. .................... 95/65 |
| 2003/0203035 A1 | 10/2003 | Hasan et al. | |
| 2003/0224936 A1 * | 12/2003 | Kretzschmar ............... 504/100 |
| 2004/0192789 A1 | 9/2004 | Smith et al. | |

FOREIGN PATENT DOCUMENTS

| | | | |
|---|---|---|---|
| WO | WO9810026 | * | 3/1998 |
| WO | WO2000054568 | * | 9/2000 |
| WO | WO 2002/028179 | | 11/2002 |

OTHER PUBLICATIONS

The Dow Chemical Company, Product Information, DOW Surfactants, Tergitol*TMN-10. Form 119-01934-0103 AMS.*
http://www.dow.com/surfactants/products/nonylph.htm, printed Jan. 12, 2006.*
http:www.dow.com/surfactants/products/octyl.htm, printed Jan. 12, 2006.*
The Dow Chemical Company, Material Safety Data Sheet for Product Name Tergitol(TM) TMN-10, Feb. 12, 2003.*

* cited by examiner

*Primary Examiner*—Timothy J Kugel
(74) *Attorney, Agent, or Firm*—Gardere Wynne Sewell, LLP

(57) ABSTRACT

Hydrotropic formulations for enhancing the moisture control in a wide variety of substrates for a range of applications, such formulations include an alkylphenol ethoxylate (APE) surfactant, a polyglycol, an antifoaming agent, and water.

8 Claims, No Drawings

WETTING AGENT FORMULATIONS FOR HYDROTROPIC MOISTURE CONTROL OF SUBSTRATES AND DISPERSED PHASES

CROSS REFERENCE TO RELATED APPLICATIONS

The present application claims priority to Provisional Application Ser. No. 60/435,854, filed Dec. 20, 2002, titled WETTING AGENT/MOISTURE CONTROL FORMULATION, which is hereby incorporated by reference

BACKGROUND OF THE INVENTION

Most chemical and physical processes require some degree of moisture control, with requirements ranging from super dry to supersaturated. Even those processes that require extreme dryness of the bulk material may involve water as a carrier of drying agents and other amendments. In all processing involving moisture control, rates of achieving the degree of saturation required are important aspects of processing efficiencies. Those familiar with chemical and physical processing will be immediately aware of how the invention herein described would be applicable to their needs.

Wetting agents, or "surfactants", are typically used to "make water wetter", i.e., to cause water to be adsorbed and/or absorbed by substrates faster and to a greater extent than is produced by water alone. The term "surfactant", short for 'SURFace ACTive AgeNT', is generally used interchangeably with the term "wetting agent". Wetting agents typically have at least two active sites, usually the opposite ends of the molecule, one hydrophilic (water-seeking) and the other hydrophobic or oleophilic (oil-seeking). Surfactants make water wetter by lowering the surface tension of the water.

Surface tension is a measure of the attraction of molecules for one another. Hydrogen bonding between water molecules is reduced by wetting agents, whose hydrophilic ends have greater attraction for water than water has for itself. Thus, water containing a wetting agent, appropriate to the solid matrix being wetted, will spread more easily over and through pores spaces of the matrix, thus permeate it faster than would normally occur.

Surfactants must be appropriate to the matrix being wetted in order to perform in the required manner. For example, surfactant molecules may react with particles, binding or precipitating the surfactant, rendering it useless. An example of this is the precipitation of soap by calcium in tap water which produces bathtub scum. Therefore, a useful formulation must employ a surfactant that prefers water, and additional agents or adjuvants/amendments carried by it, to the matrix being wetted.

Most applications of wetting agents require specific properties in addition to surfactancy, said additional properties being provided by adding additional materials to the surfactants. For example, foaming may be required, or it may be objectionable; evaporation rate may need to be fast or slow; interaction of components in the liquid phase with the solid phase may be required or detrimental; the residue left behind may be useful or objectionable to further processing, the end-use, or the environment. Optimizing properties sought for commercial, consumer, and industrial applications generally requires adding components to the wetting agent formulation that affect pH, ionic strength, and viscosity. Acids and bases; acidic, basic, and neutral salts; and organic solvents and thickeners are examples of components used to optimize the respective properties required.

SUMMARY OF THE INVENTION

The present invention describes hydrotropic formulations having useful properties, in addition to those generally contained in wetting agents, for a variety of applications. The present invention includes surfactants and surfactancy modifiers combined with hygroscopic agents and in proportions to produce additional, useful properties that are not attainable with presently known formulations. Alkyl phenol ethoxylates, anti-foaming agents, and polyglycols are combined in such proportions to provide combinations of wetting, penetrating, carrying, and moisture controlling properties not claimed by prior art. The unique property afforded by the present invention is the hydrotropic modification of dispersed phases and substrates to control evaporation rates of water, while wetting, penetrating, and carrying moisture and amending agents to sites on or within substrates for a variety of purposes.

DETAILED DESCRIPTION OF THE INVENTION

The formulations described herein include a variety of compositions that may be used in a variety of applications. Such applications include, for example, processes that require penetrating substrates rapidly to deliver moisture and/or amendments to active sites on and within the substrate, and applications where moisture control in and on substrates and residual solids, especially in open environments, is important. Fields in which the present inventions are applicable include, for example, agriculture, building products, chemical processing and specialty products, and construction.

In open environments where relative humidity and temperature vary, materials may lose or gain more water than is beneficial to the desired result. In such environments and where function requires a critical range of moisture content, the present invention affords a beneficial degree of moisture control by adjusting levels of hygroscopic components delivered to a substrate.

One example of the utility of the present invention is the control of mold proliferation. Recently, the insurance industry has reduced, and in many cases eliminated, coverage of property damage and personal injury due to black mold infestation. This problem generally arises in structures where fugitive water leaks create conditions conducive to mold growth.

Field testing has shown that the present invention can be used as a carrier for a desiccant that may act as an effective mold growth inhibitor. Furthermore, it has been found that the present invention not only carries the desiccant, but also functions synergistically with the desiccant, producing more effective inhibition than the desiccant, when the desiccant is used alone.

One such formulation carries an inorganic desiccant in a water-based formulation to active sites on a substrate and deposits the desiccant, where the desiccant-hydrotrope residue produces the desired result, namely, a moldicide that inhibits mold growth or kills mold on building materials. The hygroscopic agent in combination with the desiccant absorbs moisture in preference to the substrate, thus protecting the substrate from proliferating mold growth.

Compositions of the present invention include an alkylphenol ethoxylate (APE) surfactant combined with a polyglycol, such as for example, glycerin, or polyethylene glycol (when toxicity is not an issue) and an antifoaming agent, such as for example, an emulsion of a silicone polymer. These composition produces rapid migration over a surface, capable of depositing adjuvants, that are additional optional components of the composition also referred to in the present application as amendments. Examples of adjuvants useful in the present invention include, but are not limited to, biocides, pesticides, herbicides, catalysts, flame retardants, phlegmatizers, oxidizers, reducing agents, ion exchange resins, plasticizers, hardeners, adhesives, etchants, and zeolites. In the present application, the term carrier is also used to refer to compositions of the present invention that may or may not include one or more adjuvants.

Examples of alkylphenolethoxylates useful in the present invention include polyethoxylated nonylphenols such as 2, 6, 8-trimethyl-4-nonyloxypolyethyleneoxyethanol, commercially available under the trade designation Tergitol™ TMN-10. The useful concentration range of surfactant in the compositions of the present invention is about 10% to about 50% by volume. The surfactant is diluted with water containing a polyglycol in the range of about 0.1% to about 10% by volume, and an antifoaming agent in the range of about 0.1% to about 5% by volume.

Such a formulation may be further diluted with water and used to disperse an adjuvant. When the adjuvant is a desiccant, the resulting material functions as a moldicide formulation. The desiccant may be diluted at a ratio in the range of about 1:100 to about 1:1000 by volume to give a product that can be applied directly to surfaces for mold prevention.

One feature of the present invention is that the carrier solution dries without creating an objectionable odor or producing visible residue on the surface being treated. The property results from the inclusion in the formulation of glycerin (ca. 0.1-10% by volume), or other polyglycol at similar concentrations.

The novelty of using glycols for this application lies in fact that the active component of the moldicide is a desiccating agent, which depends on its drying action to prevent mold growth. The use of a hygroscopic agent in combination with a desiccant is not readily apparent, but the combination works in this invention because the glycol produces "hygroscopic water", i.e. water absorbed by glycol that is not available to the mold, but is available in the transport mechanism carrying and depositing the active mold-inhibiting component. This invention would also apply to other applications where a certain type of activity, or lack thereof, might require control of surface moisture levels. Lesser or greater amounts of surface moisture can be produced by varying the amount of glycol.

The optimum concentration and type of glycol depends on the type of surface being treated. Whereas high concentrations of glycol result in objectionable drying rates and surficial spotting, and indeed inhibit the desiccating mode of action of the desiccant being transported, the appropriately low concentration-range of glycol in the carrier produces a stable suspension of active mold-inhibiting complex that, when diluted, allows maximum migration-distance of the advancing carrier-front without water-saturating or spotting the treated substrate. As the solvent-front of the water based material advances, it transports the moldicide complex, deposits desiccant/hygroscopic water- complex molecules on the substrate, and produces active moldicide sites, and dries at an acceptable rate without leaving unsightly residue at terminal edges of the solvent-front.

A second embodiment of the present invention is dust suppression. Varying the ratios of components in the concentrate allows it to function as a superior additive to water for dust suppression. A water-based chemical invention is described that suppresses the production of dust at the source and produces agglomeration/precipitation of airborne dust, while retaining adsorbed moisture in the particulate/suppressant complex that prevents re-suspension of the precipitated particulate as airborne dust. The active components of this invention in its concentrated form may consist of a surfactant such as for example, Tergitol™ TMN-10 in a concentration of from about 10% to 40% by volume, a polyglycol, such as for example glycerin, in a concentration of from about 10% to about 40% by volume, an anti-foaming agent, such as , for example a polysiloxane, in a concentration range of about 3%. Water is makes up the remainder of the composition.

This formulation results in a concentrate that can be transported to a site where dust suppression is desired, and then diluted with water to provide dust suppression properties superior to those of water alone. Dilution at ratios of approximately, for example, 1:750 to 1:3000 provides desirable dust suppression properties.

The present invention utilizes a combination of surfactant/hydrotrope, hygroscopic agent, and water that activates small particles by neutralizing electric double-layers, thus destroying protective colloids, and adsorbing to particles, giving them a tendency to agglomerate. Therefore, fine particles on a surface agglomerate and are not suspended if disturbed, whereas, fine, airborne particles grow heavy with the sorbed hydrotrope, slow down, agglomerate, and precipitate. Once precipitated, the agglomerated particles must undergo biodegradation of the sorbed phase, ion-exchange, and/or other physico-chemical re-working before they can again develop as individual, fine particles.

As described, variations in the relative proportions in the formulation allow it to be used in various applications. The hydrotropic principle of the invention has demonstrated usefulness as a moldicide carrier, a moisture retention agent in agriculture, and a dust suppressant when used as described above. A wide variety of additional applications can take advantage of the unique properties of the formulations described above. In certain applications, it may be desirable to perform functions such as to wet earthy materials, with and without adjunct materials, such as sorbed/complexed organic matter, and other inorganic and organic/inorganic complexes in specific ways and with specific adjunct materials in order to accomplish specific types of wetting, e.g., to saturate substrates with moisture, to retain moisture, and to deliver active or potentially active substances to active or potentially active sites on a substrate. Additional applications may include, for example, carrying potentially catalytically active components to sites where they would become activated upon arrival by a number of possible mechanisms.

In open environments, retention of some moisture level by solids and surfaces, ranging from low to high levels, is important. Adjusting the levels of hygroscopic components in the present invention allows the desired level of moisture to be maintained.

The present invention has application as both dust suppressant and fire retardant in grain and lumber mills and other facilities where organic dust particles produce both nuisance and flammable dust. By diluting the described formulation with water as described for dust suppression, and optionally with other materials having flame retardant properties, a solution having improved properties over plain water results. The formulation of the invention provides improved agglomeration and immobilization properties, removing the dust particles from the air efficiently, and for an extended period compared to plain water. The treated water is applied as a mist to remove airborne particles, or sprayed onto various surfaces to prevent airborne dust formation. Removing the dust from the air greatly decreases fire hazards, and causing it to remain moist longer minimizes re-dispersal in the air. In addition, longer lasting dampening materials can be included, to lessen fire hazards further.

Numerous additional applications of the described formulation can be found. The following examples illustrate some of the advantages that can be obtained from a formulations of the present invention and are in no way meant to be limiting as to the scope of the present invention.

In agriculture, the formulations of the present invention, alone or in combination with other components, may be proportioned into irrigation water to carry micronutrients and soil amendments for more efficient uptake by soils and to hold surface moisture longer. In building products, the formulations of the present invention, alone or in combination with other components, may be used to deposit flame retardants, preservatives, and the like on and in wood and other semipermeable materials. Such deposition may be performed at the time the building material is manufactured, or later when it is installed.

The formulations of the present invention have widespread application in commercial and industrial fields including, for example, the chemical industry and personal specialty products In chemical industry processing, the formulations of the present invention, alone or in combination with other components, could be used to carry insoluble and slightly soluble components to preferred sites in permeable or vesicular substrates such as clays, rice hull ash, and vermiculite. In personal specialty products, the present invention, alone or in combination with other components, may be used as a hydrotropic emollient in leather and other materials that tend to dry out with age. This may greatly increase the life and useful properties of such materials, and could be applied before or after such articles were manufactured.

In construction projects where water must be applied to surfaces in an open environment, such as foundations, roadbeds, and earthy slopes, the formulation of the present invention, alone or in combination with other components, may be used to penetrate the groundmass faster and hold moisture, thus improving materials processing rates and decreasing water costs. The ability of the present formulation to associate with soils and dust particles enables it to be used in a wide variety of construction situations.

While the invention has been particularly shown and described with reference to the preferred embodiments, it will be understood by those skilled in the art that various changes in form and detail may be made therein without departing from the spirit and scope of the invention.

What is claimed is:

1. A composition useful for treating a variety of substrates comprising:
   an alkylphenol ethoxylate surfactant;
   a mixture of glycerin and polyethylene glycol, wherein the concentration of the mixture is between about 0.1% to about 10% by volume;
   an anti-foaming agent; and
   water.

2. The composition of claim 1, wherein the composition farther comprises one or more adjuvants.

3. The composition of claim 2, wherein the adjuvant is a desiccant.

4. The composition of claim 2, wherein the adjuvant is selected from the group consisting of biocides, pesticides, herbicides, catalysts, flame retardants, phlegmatizers, oxidizers, reducing agents, ion exchange resins, plasticizers, hardeners, adhesives and zeolites.

5. The composition of claim 1, wherein the alkylphenol ethoxylate surfactant comprises 2, 6, 8-trimethyl-4-nonyloxypolyetheleneoxyethanol.

6. The composition of claim 1, wherein the anti-foaming agent is a polysiloxane polymer or emulsion thereof.

7. The composition of claim 1, wherein the concentration of anti-foaming agent is between about 0.1% and 5% by volume.

8. The composition of claim 1, wherein the concentration of the surfactant is between about 1% and 50% by volume.

* * * * *